(12) United States Patent
Guerin et al.

(10) Patent No.: US 10,242,761 B2
(45) Date of Patent: Mar. 26, 2019

(54) METHOD FOR PREPARATION OF ALPHA SOURCES OF POLONIUM USING SULFIDE MICRO-PRECIPITATION

(71) Applicant: ATOMIC ENERGY OF CANADA LIMITED, Chalk River (CA)

(72) Inventors: Nicolas Guerin, Chalk River (CA); Xiongxin Dai, Chalk River (CA)

(73) Assignee: ATOMIC ENERGY OF CANADA LIMITED (CA)

( * ) Notice: Subject to any disclaimer, the term of this patent is extended or adjusted under 35 U.S.C. 154(b) by 564 days.

(21) Appl. No.: 14/781,011

(22) PCT Filed: Mar. 25, 2014

(86) PCT No.: PCT/CA2014/050306
§ 371 (c)(1),
(2) Date: Sep. 28, 2015

(87) PCT Pub. No.: WO2014/153658
PCT Pub. Date: Oct. 2, 2014

(65) Prior Publication Data
US 2016/0055928 A1    Feb. 25, 2016

Related U.S. Application Data

(60) Provisional application No. 61/805,626, filed on Mar. 27, 2013.

(51) Int. Cl.
*G21G 4/04* (2006.01)
*C01B 17/20* (2006.01)
*C01G 3/00* (2006.01)
*C01G 99/00* (2010.01)
*G21G 1/00* (2006.01)

(52) U.S. Cl.
CPC ............... *G21G 4/04* (2013.01); *C01B 17/20* (2013.01); *C01G 3/00* (2013.01); *C01G 99/00* (2013.01); *C01P 2006/80* (2013.01); *G21G 2001/0094* (2013.01)

(58) Field of Classification Search
CPC ............. C01G 3/00; C01B 17/20; G21G 4/04
See application file for complete search history.

(56) References Cited

U.S. PATENT DOCUMENTS 2,462,241 A    2/1949   Wallhausen et al.

FOREIGN PATENT DOCUMENTS

| JP | 2003193283 | 7/2003 |
| JP | 2003193283 A | 7/2003 |
| WO | 2004106560 A1 | 9/2004 |

(Continued)

OTHER PUBLICATIONS

Extended European Search Report, Application No. 14773597.1; dated Oct. 12, 2016.

(Continued)

*Primary Examiner* — Melissa S Swain
(74) *Attorney, Agent, or Firm* — Polsinelli PC (57) ABSTRACT

A method for preparing alpha sources of polonium. A sample of polonium is provided in a solution. A controlled amount of sulfide and a controlled amount of a metal capable of forming an insoluble sulfide salt in the solution are introduced into the solution, in order to co-precipitate polonium from the solution. The precipitates are filtered out.

16 Claims, 9 Drawing Sheets

(56) References Cited

FOREIGN PATENT DOCUMENTS

WO        2004106560      12/2004

OTHER PUBLICATIONS

P.E. Figgins, The Radiochemistry of Polonium, Dated Jan. 1, 1961.
English Abstract of JP2003193283; Retrieved Jan. 17, 2017 from www.espacenet.com.
Figgins, P.E., "The Radiochemistry of Polonium", Jan. 1, 1961, Retrieved from the Internet, http://library.lanl.gov/cgi-bin/getfile?rc000006.pdf.
Extended European Search Report dated Oct. 12, 2016 for corresponding European Patent Application No. 14773597.1.
Communication pursuant to Rules 70(2) and 70a(2) EPC dated Oct. 28, 2016 for corresponding European Patent Application No. 14773597.1.

Table 1. Solubility product constants of some example sulfide salts.

| Salt | Solubility product constant |
|---|---|
| PoS | $5 \times 10^{-29}$* |
| HgS | $1 \times 10^{-52}$ |
| CuS | $1 \times 10^{-38}$ |
| $Fe_2S_3$ | $1 \times 10^{-85}$ |
| $Ag_2S$ | $1 \times 10^{-51}$ |
| PbS | $1 \times 10^{-29}$ |
| NiS | $1 \times 10^{-21}$ |
| FeS | $1 \times 10^{-17}$ |

*Value in 1 M HCl instead of water

FIG. 8

Table 2. Decontamination factors and some potential radionuclide interferences for polonium isotopes.

| Element | DF* | Potential interferences (alpha energy (keV) and emission intensity) | | |
|---|---|---|---|---|
| | | $^{208}$Po (5116) 100% | $^{209}$Po (4879) 99.2% | $^{210}$Po (5304) 100% |
| Ra | 135 | | $^{226}$Ra (4784) 93.8% | $^{224}$Ra (5449) 4.9% |
| Th | 750 | $^{229}$Th (4901) 10.2% | $^{229}$Th (4845) 56% | $^{228}$Th (5341) 26.7% |
| | | | $^{229}$Th (4814) 9.3% | $^{228}$Th (5423) 73% |
| U | >1114 | | $^{234}$U (4776) 72.5 % | |
| | | | $^{233}$U (4783) 13.2% | |
| | | | $^{233}$U (4825) 84.4% | |
| Np | >1407 | | $^{237}$Np (4788) 47.8% | |
| | | | $^{237}$Np (4772) 22.7% | |
| Pu | >2381 | $^{239}$Pu (5157) 70.8% | $^{242}$Pu (4901) 78% | |
| | | $^{239}$Pu (5144) 17.1% | $^{242}$Pu (4856) 22.4% | |
| | | $^{239}$Pu (5106) 11.9% | | |
| | | $^{240}$Pu (5168) 73.5% | | |
| | | $^{240}$Pu (5124) 26.4% | | |
| Am | 413 | | | $^{241}$Am (5443) 12.8% |
| | | | | $^{243}$Am (5277) 88% |

* DF: Decontamination factor

FIG. 9

METHOD FOR PREPARATION OF ALPHA SOURCES OF POLONIUM USING SULFIDE MICRO-PRECIPITATION

CROSS-REFERENCE TO RELATED APPLICATIONS

The present disclosure claims priority from U.S. provisional patent application No. 61/805,626, filed Mar. 27, 2013, the entirety of which is hereby incorporated by reference.

TECHNICAL FIELD

The present disclosure relates generally to methods for preparation of alpha sources of polonium. In particular, the present disclosure relates to methods using sulfide micro-precipitation.

BACKGROUND

Polonium-210 ($^{210}$Po) is naturally present at trace levels in the environment as a part of the uranium-238 ($^{238}$U) decay chain. It is typically considered as one of the most radiotoxic nuclides: only one microgram of this alpha emitter ($t_{1/2}$=138 d) may be sufficient to be fatal to an average adult, making it around 250000 times more toxic than hydrogen cyanide[1,2]. Due to its toxicological properties, studies have been done to determine $^{210}$Po in a variety of samples such as soils, sediments, water, food, tobacco leaves, cigarettes, urine, and biological materials[3-12].

Polonium (Po) samples for alpha counting are typically prepared by spontaneous plating on metallic discs. Although silver discs have typically been used for Po plating[13], nickel, copper, and stainless steel discs may also be employed due to their lower costs[14,45]. Prior to being used, the metallic discs are typically polished and cleaned to remove the dust and the oxide layer at the surface[16]. They are then typically brought in contact with the sample in a minimum volume of diluted HCl solution (typically about 0.1 to 1 M) and agitated for about 3-6 hours at a higher temperature (e.g., 80-95° C.) to obtain the highest yields possible (typically about 90%)[8,13-16]. The metallic discs are typically subsequently rinsed with water[17] and heated at relatively high temperatures (typically about 300° C.) for few minutes to oxidize the polonium and reduce the risk of contamination to the alpha detector[15]. Although this sample preparation technique is widely performed, this technique, in particular the heating step, may be inconvenient and time consuming. In addition, the plating is typically performed using in-house assemblies resulting in a low analysis throughput.

SUMMARY

In some example aspects, the present disclosure provides a method for preparing alpha sources of polonium, which may include: providing a sample of polonium in a solution; introducing a controlled amount of sulfide and a controlled amount of a metal capable of forming an insoluble sulfide salt in the solution, in order to co-precipitate polonium from the solution; and filtering out the precipitates.

BRIEF DESCRIPTION OF THE DRAWINGS

Reference will now be made to the drawings, which illustrate example embodiments of the present disclosure, and in which.

It will be noted that throughout the appended drawings, like features are identified by like reference numerals.

DETAILED DESCRIPTION

Figure 8:
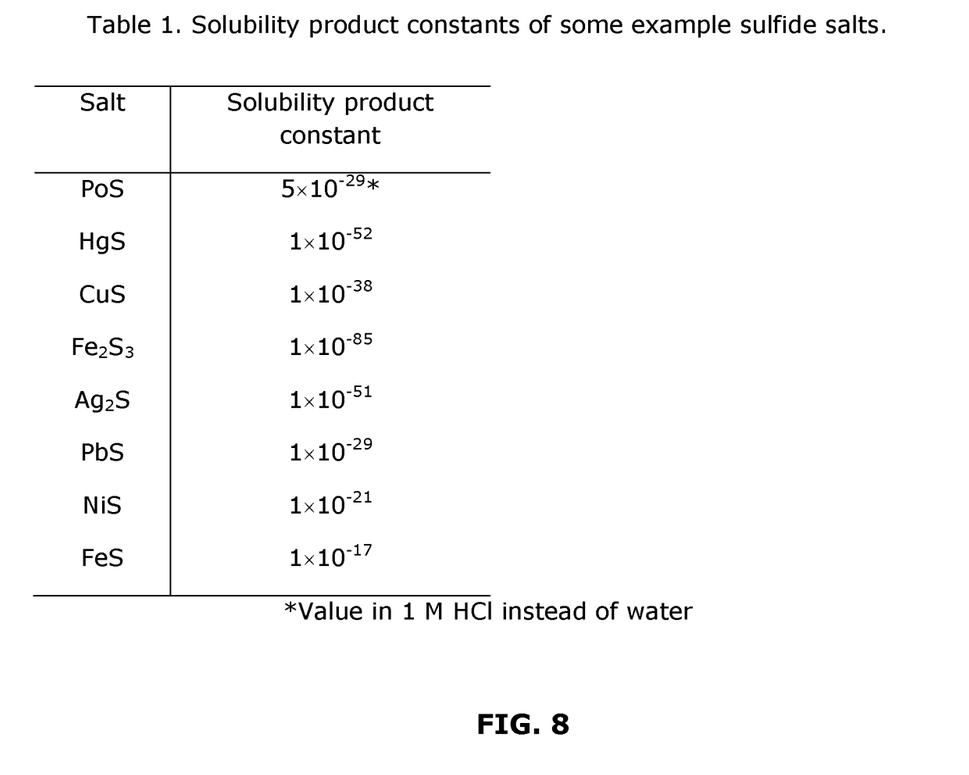
FIG. 8 is a table of solubility product constants for some example sulfide salts.

In the presence of sulfide, $Po^{2+}$ is expected to be insoluble in 1 M HCl with a solubility product constant of about $5 \times 10^{-29}$ (see FIG. 8)[18]. This low solubility has been applied to separate polonium sulfide (PoS) from tellurium and bismuth in 1 M HCl[19]. As shown in FIG. 8, mercury, silver and copper sulfides are also insoluble sulfide salts[20], which may enable their use as co-precipitating agent of PoS for the preparation of thin-layer counting sources by alpha spectrometry. The present disclosure considers the use of certain sulfide salts (such as certain transition metal salts), in particular CuS. However, other sulfide salts may be suitable, such as sulfide salts with low solubility (including those that may not be listed in FIG. 8, such as Cr and Co sulfide salts). For example, sulfide salts of Fe, Pb, Ni, Cd, Co, Cr, Mn, Tl and Zn may be suitable. Investigations similar to those described herein may be carried out to determine the suitability of using such other sulfide salts, as well as the suitable reaction conditions when using such other sulfide salts.

Although the present disclosure describes investigation of reaction conditions for micro-precipitation of polonium from a solution containing HCl, other solutions (e.g., acidic or non-acidic solutions) may be suitable. Although the described example investigations consider HCl being added to provide an acidic solution, other acids (e.g., hydrofluoric acid, phosphoric acid or sulfuric acid) may be used in order to achieve an acidic solution. Investigations similar to those described herein may be carried out to determine the suitability of a given solution, as well as the suitability of other reaction conditions.

Based on the present disclosure, relatively large batches of Po samples may be relatively rapidly processed to increase sample analysis throughput. A vacuum box system may be suitable for such an application of the present disclosure. Micro-precipitation methodologies using lanthanide fluoride for actinides[21-23] and barium sulfate for radium-226 ($^{226}$Ra) have been employed for the preparation of thin-layer counting sources by alpha spectrometry[24,25], however techniques used in micro-precipitation of actinides and radium-226 typically are not expected to work for micro-precipitation of polonium.

In various examples and embodiments, the present disclosure may provide a relatively robust, simple and/or fast method for the preparation of polonium counting sources for alpha spectrometry using sulfide micro-precipitation, for example using copper sulfide micro-precipitation. Although copper sulfide is discussed herein as an example, other sulfide salts may be suitable. Copper may be practically useful, for example compared to silver and mercury, as silver is typically light sensitive and less stable in solution (and may result in poor spectral resolution in alpha spectrometry); while mercury may be undesirable due to its toxicity. However, use of silver sulfide and/or mercury sulfide for co-precipitation of polonium may be appropriate in some applications, and is within the scope of the present disclosure.

The present disclosure discusses suitable conditions for the co-precipitation of PoS, and examples of suitable ranges are described. Other ranges and sub-ranges may be possible.

In various example studies, potential radionuclide and chemical interferences were also investigated. The possibility of using $^{209}$Po as a yield tracer to determine $^{210}$Po was also investigated.

In the disclosed examples, described further below, Po was co-precipitated with CuS, filtered onto Eichrom Resolve™ filters and counted. The disclosed method may be faster, cheaper, and/or more convenient than conventional spontaneous plating on metallic discs and example studies disclosed herein found that similar yields may be obtained (about 80-90%).

In example studies, described below, suitable conditions for the micro-precipitation method using CuS as co-precipitate were found (e.g., about 50 μg of $Cu^{2+}$ in about 10 mL of about 1 M HCl). These reaction conditions may be compatible with conventional preparation and purification procedures for polonium samples (typically using about 0.1 to 1 M HCl). The example results showed that most susceptible radionuclide interferences (e.g., Ra, Th, U, Np, Pu and Am) for polonium isotopes (namely, $^{208}$Po, $^{209}$Po and $^{210}$Po) may be effectively removed. The effects of several transition metals (namely, $Cu^{2+}$, $Ag^{+}$, $Fe^{3+}$, $Fe^{2+}$, $Pb^{2+}$ and $Ni^{2+}$) on the yield and the resolution of alpha peaks were also assessed. The example results demonstrated the versatility of the presently disclosed method for environmental and/or biological matrix. In various example studies, the disclosed method has been applied to determine various amounts of $^{210}$Po using $^{209}$Po as a yield tracer.

Development of an example method for micro-precipitation of Po using a sulfide salt as co-precipitate is now described. This example is provided for the purpose of illustration only and is not intended to be limiting. For example, although CuS is described as an example co-precipitate, other sulfide salts may be used, and may be appropriately selected (e.g., based on solubility product constants). Similarly, although HCl is described as being added to achieve an acidic solution, other acids may be added, or the solution need not be acidic. Certain example reaction conditions are also described as being suitable. These are also provided for illustration only and may be varied as appropriate, for example using appropriate investigation to determine suitability.

Suitable Reaction Conditions

Example studies were carried out to determine suitable reaction conditions for obtaining polonium using micro-precipitation, with CuS as co-precipitate. Conditions that were investigated included: amount of $Cu^{2+}$ added to the solution, reaction time before filtering out precipitates, concentration of HCl in the solution, and total volume of solution used in the reaction. In these investigations, temperature and pressure were kept at ambient levels, as this may be more practical to implement. The disclosed investigations also arrived at a set of reaction conditions that were found to be particularly useful. However, other reaction conditions may be suitable. Similar investigations may be readily carried out to determine suitable reaction conditions using other sulfide salts as co-precipitate.

For the solutions investigated, about 50 mBq of $^{209}$Po was added in disposable 50 mL conical polypropylene tubes. Suitable amounts of $Cu^{2+}$ for the reaction was first investigated by adding known quantities of $Cu^{2+}$ from a copper solution (about 500 mg/L in 1% v/v HCl). The co-precipitation was carried out in about 10 mL of about 1 M HCl by adding about 1 mL of 0.3% m/v $Na_2S$ solution. Then, the influence of the precipitation time was investigated. Using selected suitable conditions (in these examples, about 50 μg of $Cu^{2+}$ and a reaction time of about 10 minutes), the influence of the HCl molarity and volume of the solution was investigated.

Figure 1:
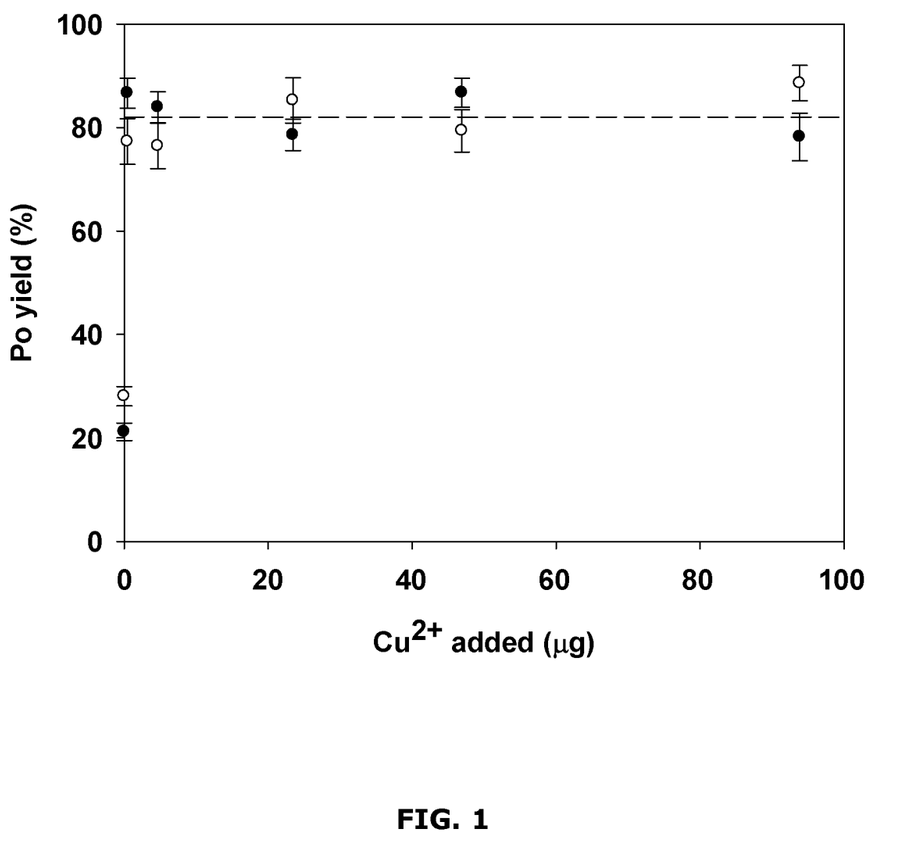
FIG. 1 is a chart showing example polonium yields for different amounts of added copper.

FIG. 1 shows example results of micro-precipitation yields of $^{209}$Po as a function of $Cu^{2+}$ amount added in about 10 mL of about 1 M HCl. Without the addition of $Cu^{2+}$, a yield of 25±2% was obtained. By adding controlled amounts of $Cu^{2+}$, the yield was found to improve. As shown in the example results, with the addition of about 1 μg of $Cu^{2+}$, a yield of around 80% was reached. The yield was substantially the same when controlled amounts of about 5 μg, about 25 μg, about 50 μg and about 100 μg of $Cu^{2+}$ were added. The yield obtained was close to the conventional spontaneous plating technique (typically about 90% in optimal conditions).

The low yield observed when $Cu^{2+}$ was not added suggests that part of divalent or tetravalent Po was precipitated as PoS, which may be consistent with its low solubility (see FIG. 8). This may also be consistent with the observed improved yield when a co-precipitating agent (in this case, $Cu^{2+}$) is added. Note that $Po^{4+}$ is a relatively strong oxidant ($E°=1.03$ V) compared to $S^{2-}$ ($E°=0.14$ V)$^{27}$ and is expected to be reduced to $Po^{2+}$ in those conditions, suggesting that no valence adjustment is required.

Figure 2:
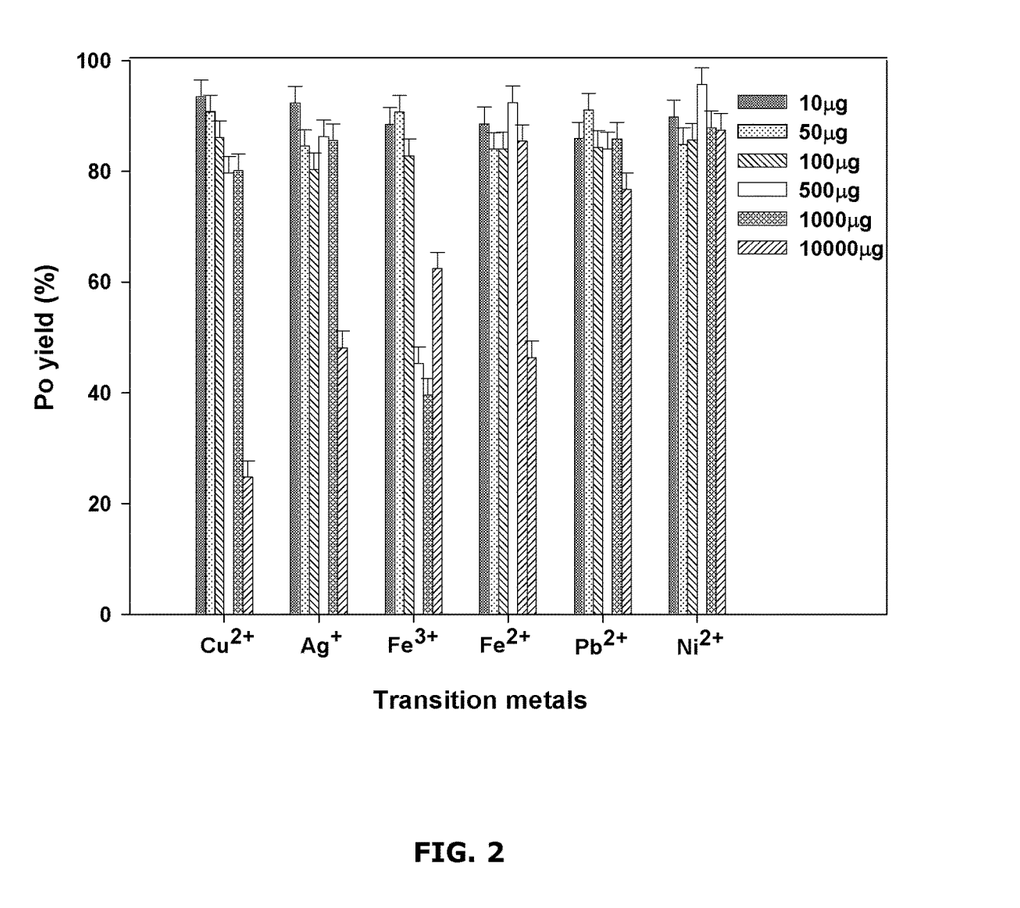
FIG. 2 is a chart showing example interferences of polonium yields by different transition metals added at different amounts.

Polonium yield was also investigated as a function of different interfering transition metals added, at different amounts (see FIG. 2). The spectral quality of alpha spectrometry of the resulting alpha counting source was also investigated (see FIG. 3).

From these example results, it was determined that a controlled amount of as little as about 1 μg of $Cu^{2+}$ added to about 10 mL solution of polonium in HCl may be sufficient to obtain an acceptably high yield of polonium. It may be useful to introduce more $Cu^{2+}$, in order to ensure that a sufficiently high yield is obtained, and to insure against the possibility that $Cu^{2+}$ is caught up by impurities.

Figure 3:
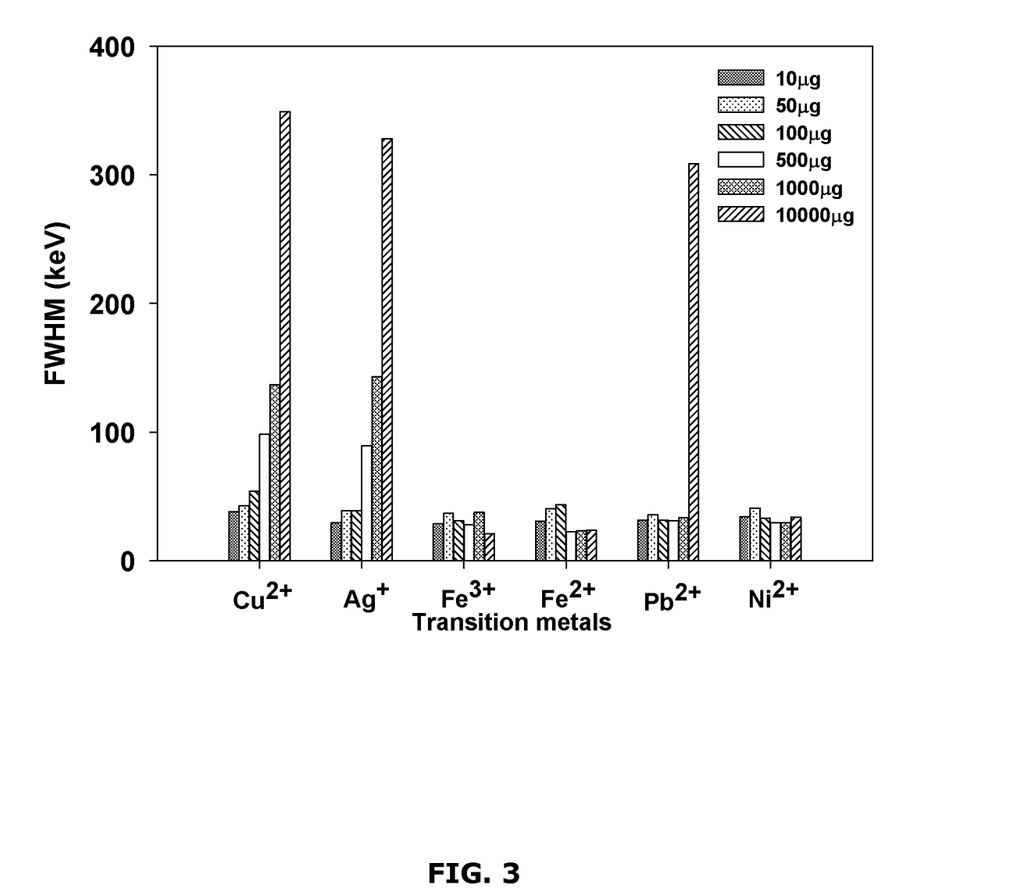
FIG. 3 is a chart showing example interferences of alpha energy resolution for polonium by different transition metals added at different amounts.

However, as shown in FIGS. 2 and 3, using too large an amount of $Cu^{2+}$ (e.g., much more than about 100 μg in a 10 mL solution) may be undesirable, as the co-precipitate obtained may have unacceptably low polonium yield (see FIG. 2) and/or may have poor energy resolution for alpha spectrometry (see FIG. 3). This drop in performance may be due to self-absorption of alpha particles in the thicker counting sources.

In the example investigations, about 50 μg of $Cu^{2+}$ added to about 10 mL of solution was found to be suitable. A lower quantity of added $Cu^{2+}$ may also be suitable, for example depending on the specific sample matrix.

Using more than a minimum amount of $Cu^{2+}$ may also have a practical merit, since the formation of the brown colloidal CuS precipitate in the solution and on the filters may be observed, which may be convenient for routine laboratory work.

Figure 4:
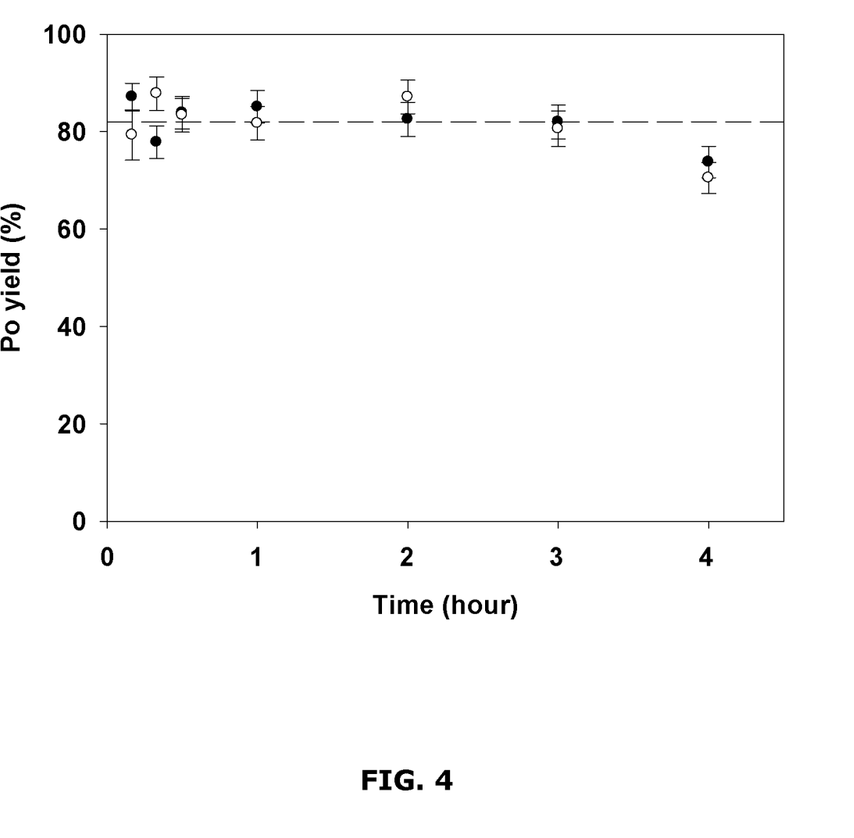
FIG. 4 is a chart showing example polonium yields for different reaction times.

FIG. 4 shows Po yield as a function of time. These example results were obtained using about 50 μg of $Cu^{2+}$ in about 10 mL of about 1 M HCl, and measuring Po yield after a reaction time of about 10 min, about 20 min, about 30 min, about 1 hr, about 2 hr, about 3 hr and about 4 hr.

The example results show that a Po yield around 80% was achieved after about 10 minutes. This yield was substantially the same up to at least 3 hours and slowly decreased afterwards. It was observed that, beyond 3 hours, the brown colloidal precipitate slowly coagulated with time and adhered onto the surface of the plastic tubes. After about 24 hours, the precipitate was completely adsorbed on the surface of the tubes leading to a clear solution. Thus, filtration may be conducted within about 3 hours after the addition of the sulfide, in order to avoid the loss of the precipitate due to adsorption.

These example results also indicate that, using the disclosed method, a sufficient polonium yield may be obtained in as little as about 10 min, which may be advantageously faster than the conventional spontaneous plating methods, which typically takes at least 3 hours to reach an equivalent yield.

Figure 5:
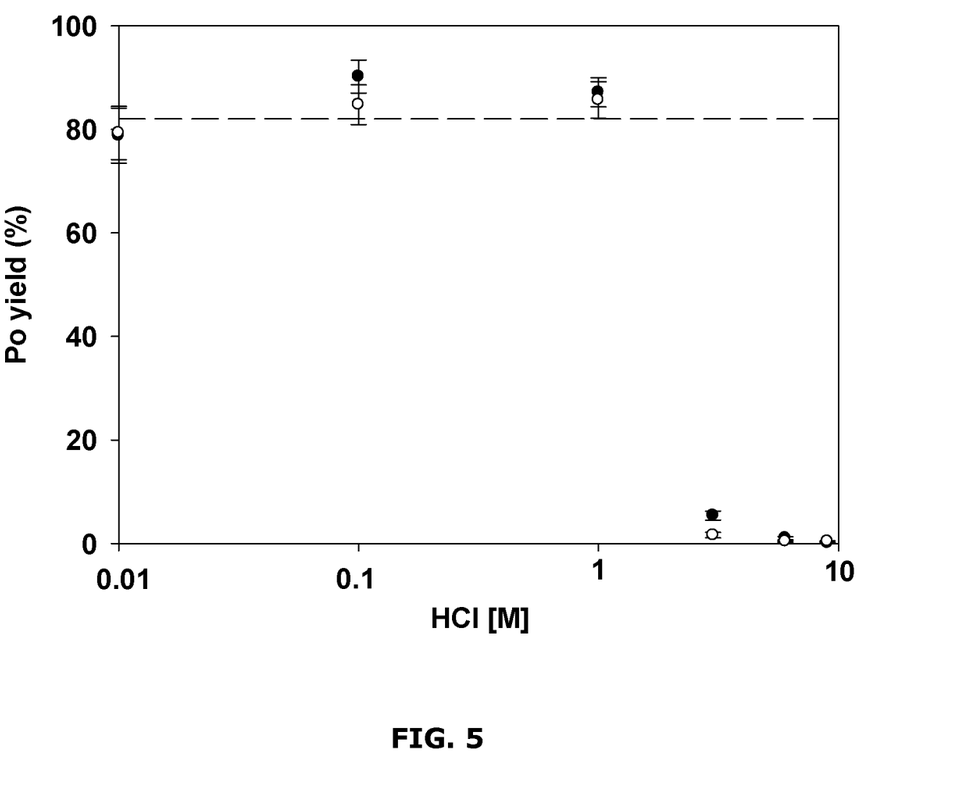
FIG. 5 is a chart showing example polonium yields for different HCl concentrations.

FIG. 5 shows example results from an investigation of the influence of HCl molarity on the Po yield. This example study was carried out using about 10 mL of the solution, about 50 μg of $Cu^{2+}$ over a reaction time of about 10 minutes. For relatively low HCl molarities (e.g., about 0.01 to about 1 M), the yield remained about the same (at about 80%), but decreased for higher HCl concentrations (e.g., above about 1 M). Solutions with concentrations higher than about 1 M were almost colorless and little precipitate was formed. The precipitates found on the filters obtained from reactions using about 0.01 M solutions were darker and less granular than those from reactions using about 1 M HCl. The FWHM (full width half maximum) of the alpha peak for $^{209}Po$ was wider for the precipitates obtained using about 0.01 M HCl (150 keV) in comparison to those obtained using about 0.1 M HCl (55 keV) and about 1 M HCl (32 keV) (example results not shown).

At lower HCl molarities, the crystallinity of the precipitates might be different, resulting in the observed variation in color and poor alpha energy resolution. For higher HCl molarities (e.g., above about 1 M), the loss in Po yield may be due to PoS and CuS salts being more soluble at lower pH and practically not precipitated and/or PoS and CuS not being precipitated because $H_2S$ was formed too fast and immediately vaporized, which may have prevented the micro-precipitation from occurring.

To better understand the observed behavior, tests were carried out. To a solution of about 3 M HCl, 7 times more sulfide than normal was added, which formed the brown CuS precipitate with a yield of 93±4%. For a higher concentration of HCl (about 10 M), no precipitate was observed even though excessive amount of solid sodium sulfide was added to the solution and a significant amount of gaseous $H_2S$ was produced. Another test was performed to first form a CuS precipitate in about 1 mL of about 1 M HCl; about 20 mL of concentrated HCl was then added, which brought the concentration to approximately 10 M; but the brown CuS precipitate remained undissolved with a yield of 77±4% for $^{209}Po$. The results of these tests suggested that the low Po yield in low pH conditions likely was not caused by the dissolution of the precipitate, but rather by the fast vaporization of $H_2S$ that made the precipitate more difficult to form.

Based on the results of these example studies, it was determined that a solution using a HCl concentration between about 0.1 and about 1 M may be suitable for co-precipitation of Po and CuS. Higher concentrations of HCl may help to reduce some potential interferences, thus HCl at a concentration of about 1 M HCl may be more useful.

Figure 6:
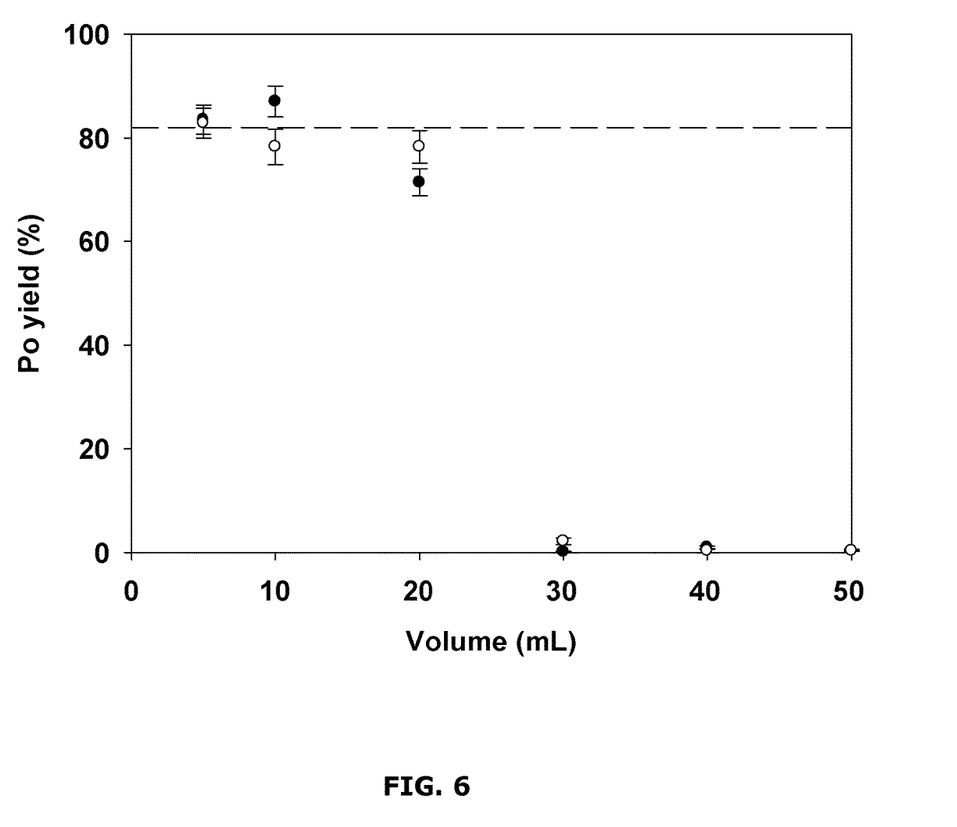
FIG. 6 is a chart showing example polonium yields for different sample volumes.

FIG. 6 shows example results from an investigation of the effect of solution volume on the micro-precipitation yield. The example investigation was carried out using about 1 M HCl and about 50 μg of $Cu^{2+}$ in solution volumes of about 5 mL, about 10 mL, about 20 mL, about 30 mL, about 40 mL and about 50 mL.

The Po yields were found to be 83±3% for reactions carried out using solution volumes of about 10 mL or less, and slightly decreased for reactions carried out using solution volumes of about 20 mL (75±3%). However, for reactions carried out using solution volumes of about 30 mL or more, the Po yields dropped to almost zero and the solutions became colorless. It was found that it was possible to achieve an acceptable yield (90±4%) by adding 7 times more sulfide to about 40 mL of about 1 M HCl solution. Since a larger amount of HCl may facilitate the formation of $H_2S$ and prevent the precipitation, more sodium sulfide may need to be added to maintain a sufficiently high concentration of $S^{2-}$ in the solution to initiate the micro-precipitation.

As described above, Po micro-precipitation with CuS as a co-precipitate may be achieved relatively quickly (e.g., in about 10 min, and up to about 3 hr) with sufficiently high yields (e.g., about 80% or greater) in about 5 to about 10 mL of about 0.01 to about 1 M HCl using about 1 to about 100 μg of $Cu^{2+}$. In particular, a sufficiently high yield of Po was found to be obtained with CuS as a co-precipitate, using a reaction time of about 10 min, a solution volume of about 10 mL, HCl concentration of about 1 M and about 50 μg of $Cu^{2+}$.

An example suitable method for co-precipitation of polonium with CuS is described below. Suitable conditions for this example method were determined based on the investigations described above. Variations on this example method may be possible.

In 50 mL polypropylene conical tubes, about 50 mBq of $^{209}Po$ may be added and mixed into about 10 mL of 1 M HCl. For each sample, $7.87 \times 10^{-7}$ moles of $Cu^{2+}$ (about 50 μg) followed by $4.17 \times 10^{-5}$ moles of $S^{2-}$ may be added and the sample vigorously shaken. After sitting for about 10 minutes, the sample may be filtered using a suitable filter, for example through a 0.1 μm Resolve™ filter (Eichrom Technologies Inc., Lisle, Ill.). Prior to the filtration, the hydrophobic filter should be wetted, such as with 1-2 mL of 80% ethanol, followed by 1-2 mL of UPW. The sample may be then filtered, for example at a low flow (approximately 3-4 mL/min) using a vacuum box (Eichrom Technologies Inc., Lisle, Ill.). After the final rinse (e.g., using 1-2 mL of 80% ethanol), the precipitate is dried (e.g., air dried for few minutes) and subsequently mounted on a stainless steel disc, for example using double-sided adhesive tape, for counting by alpha spectrometry.

The present disclosure may provide a useful alternative to the conventional spontaneous plating methodology for the preparation of Po alpha counting sources. The disclosed micro-precipitation method may be faster and easier to operate. It has been found that, for example, using a 12-holes vacuum box for filtration, it may be possible to perform all the preparation steps and process 12 samples within about one hour. Since current conventional spontaneous plating methods reported for the determination of Po are typically performed in a relatively small volume of 0.1 to 1 M HCl, similar to the reaction conditions of the present disclosure, the disclosed micro-precipitation technique may be readily implemented into current practice.

Interference Assessment

Further example studies were carried out to investigate the possibility of interference by radionuclide and other chemicals in examples of the disclosed method.

Radionuclide Interferences

Other alpha emitters, including Ra and actinide nuclides (e.g., Th, U, Np, Pu and Am), may interfere with counting of Po isotopes of interest ($^{208}$Po, $^{209}$Po or $^{210}$Po) if they were to co-precipitate with the sulfide salt.

Figure 9:
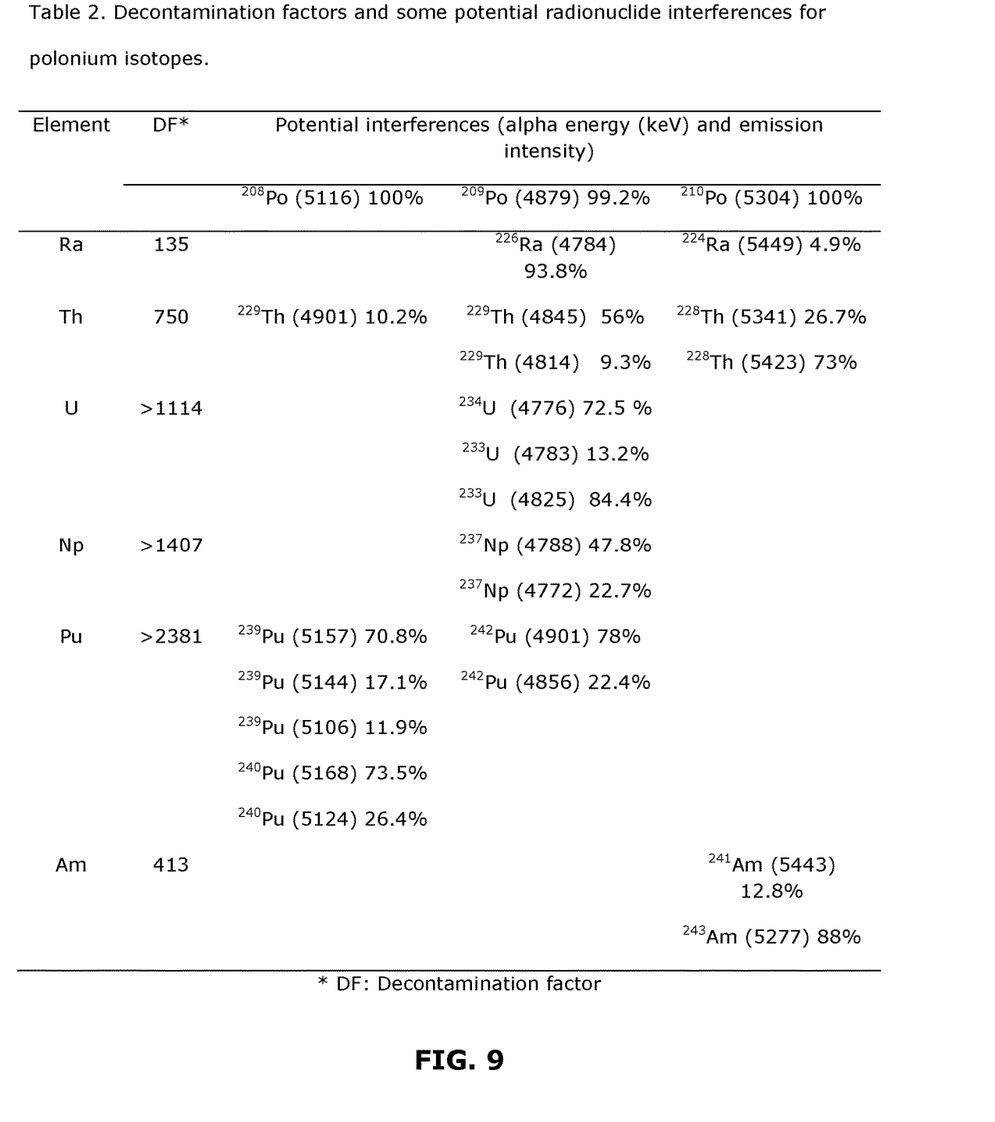
FIG. 9 is a table of decontamination factors and potential radionuclide interferences for some example polonium isotopes.

Decontamination factors for Ra and example actinides were determined and are shown in FIG. 9, along with their alpha energies and emission intensities of the most susceptible interfering isotopes. An investigation of this possible interference is described below.

For each sample, approximately 50 mBq of Ra and actinide standards were added in about 10 mL of about 1 M HCl. The example CuS micro-precipitation procedure described above (using about 50 μg of $Cu^{2+}$ in about 10 mL of about 1 M HCl, over a reaction time of about 10 min) was followed and the filtrate solution was collected. Radium was determined in the filtrate using a barium sulfate micro-precipitation procedure as previously published by Maxwell[25]. Actinides were measured in the filtrate using cerium fluoride ($CeF_3$) micro-precipitation as previously described by Dai[24,26]. The CuS filter and the filtrate samples were both counted by alpha spectrometry, and the decontamination factor was calculated as the ratio of the Ra or actinide activity in the filtrate to that on CuS filter.

A moderate decontamination factor (134) was obtained for Ra; whereas higher decontamination factors (greater than 400) were obtained for actinides. These example results demonstrate that Ra and actinides are not expected to form insoluble sulfides in acidic solutions. Therefore, similar to the conventional spontaneous plating technique, no purification may be required to remove potential radionuclide interferences for Po samples obtained using the disclosed method.

Chemical Interferences

The effects of some example transition metals (in this example study, $Ag^+$, $Cu^{2+}$, $Fe^{3+}$, $Fe^{2+}$, $Pb^{2+}$ and $Ni^{2+}$ were considered) that could co-precipitate with sulfide were also evaluated. After the addition of known quantities of those elements and 50 mBq of $^{209}$Po, the example CuS micro-precipitation procedure described above (using about 50 μg of $Cu^{2+}$ in about 10 mL of about 1 M HCl, over a reaction time of about 10 min) was applied to prepare the counting sources.

FIG. 2 shows example results illustrating the influence of the example transition metals on the Po yield. FIG. 3 shows example results illustrating the influence of the example transition metals on alpha energy resolution.

For $Cu^{2+}$, which is also the co-precipitating agent, the Po yield remained substantially constant (about 80%) up to about 1000 μg of added $Cu^{2+}$ and then decreased to 25±3% for about 10000 μg of added $Cu^{2+}$ (see FIG. 2). The FWHM increased as the amount of added $Cu^{2+}$ increased. For the Po samples obtained from solutions containing more than 100 μg of added $Cu^{2+}$, FWHM of about 328 keV was reached with about 10000 μg of added $Cu^{2+}$ (see FIG. 3). The precipitates on the filters were observed to be darker as the amount of added $Cu^{2+}$ increased.

Similar results were obtained for $Ag^+$. The Po yield was relatively stable up to about 1000 μg of $Ag^+$ added to the solution and decreased afterwards (see FIG. 2). The energy resolution was more affected for the Po samples obtained from solutions with more than 100 μg of added $Ag^+$ (see FIG. 3), and the filters were observed to be darker as the amount of added $Ag^+$ increased. Because of the relatively low solubility of silver sulfide (see FIG. 8), silver was expected to completely precipitate in the presence of $S^{2-}$, resulting in a lower yield and poor energy resolution due to the self-absorption of alpha particles by the thicker precipitate.

Although not tested, it is expected that $Hg^{2+}$ would behave similarly to $Ag^+$ due to its low solubility (see FIG. 8). For biological and environmental samples with a high concentration of $Cu^{2+}$ or $Ag^+$, additional purification (e.g., using an Eichrom Sr Resin)[28] may be required to reduce these chemical interferences before the micro-precipitation.

The example results also show that the micro-precipitation Po yield decreased as the amount of $Fe^{3+}$ added to the solution surpassed about 100 μg and a minimal yield was found at about 1000 μg of added $Fe^{3+}$ (40±3%). The Po yield increased to 62±3% at about 10000 μg of added $Fe^{3+}$ (see FIG. 2). However, the alpha energy resolution was found to be not affected as the amount of added $Fe^{3+}$ increased (see FIG. 3). The brown color characteristic of CuS was observed on the filters for the precipitate obtained from solutions containing about 100 μg of added $Fe^{3+}$ or less; but the filters for the precipitate obtained from solutions containing about 500 and about 1000 μg of added $Fe^{3+}$ were white. For the precipitate obtained from solutions containing about 10000 μg of added $Fe^{3+}$, the filter was pale yellow. Also, the CuS precipitate formed very slowly for the solutions with about 100 μg of added $Fe^{3+}$ and no visible coloration in the solutions was observed for higher added $Fe^{3+}$ quantities.

These results suggest that the precipitation of CuS was hampered as excessive ferric ion might compete with $Cu^{2+}$ and form a complex with $S^{2-}$ in the solution. It may be that, as the ferric sulfide complex was quickly formed, fast consumption of the $S^{2-}$ in the solution and high solubility of ferric sulfide prevented the micro-precipitation of CuS from occurring.

To verify this hypothesis, the solubility of ferric sulfide was examined. In about 1 M HCl solution containing about 1000 μg of $Fe^{3+}$, 10 times more sulfide was added, which changed the yellow complex of $FeCl_2^+$ to colorless with no precipitate formed. Furthermore, the black $Fe_2S_3$ precipitate prepared in water was found to be soluble in about 1 M HCl and the $H_2S$ gas was produced. These tests indicate solubility of $Fe_2S_3$ in 1 M HCl. In another test, 4 times more sulfide was added to a solution of about 1000 μg of added $Fe^{3+}$, and an improved yield of 93±4% was achieved. For the solution containing about 10000 μg of added $Fe^{3+}$, a pale yellow precipitate was observed, possibly due to the formation of trace $Fe_2S_3$ that adsorbed $FeCl^{2-}$ in the presence of high concentration of Fe(III) in the solution. For verification, a test was performed by filtering a mixture of $S^{2-}$ and about 10000 μg of added $Fe^{3+}$ with no $Cu^{2+}$ added, and a yellow precipitate was observed. In addition, the alpha energy resolution was found to be not affected by the amount of $Fe^{3+}$ added, confirming that only low quantity of the precipitate was produced.

For $Fe^{2+}$, the Po yield was found to be consistently high except for about 10000 μg of added $Fe^{2+}$ (46±3%, see FIG. 2). The alpha energy resolution was found to be not affected (see FIG. 3). The filters showed the characteristic brown color of CuS precipitate, except that the precipitates obtained from solutions with about 10000 μg of added $Fe^{2+}$ were white. A slower CuS precipitation was observed for the solutions of about 1000 μg added $Fe^{2+}$. Adding more sulfide to a solution of about 10000 μg added $Fe^{2+}$ increased the yield to 87±4%. Since ferrous ion is more soluble in 1 M HCl with sulfide than ferric ion (see FIG. 8), a higher quantity of ferrous iron (about 10000 μg) may be needed to compete for $S^{2-}$ and interfere with the CuS precipitation.

These results may be useful since $Fe(OH)_3$ pre-concentration procedures are typically used for the determination of Po in environmental and biological samples[13,16]. A reduction of $Fe^{3+}$ to $Fe^{2+}$ may be helpful to alleviate the influence of $Fe^{3+}$ on the recovery.

For $Pb^{2+}$, the Po yields were relatively constant at 85±5% for the different amounts of added $Pb^{2+}$ (see FIG. 2), but the FWHM value was found to increase considerably for the solution of about 10000 μg added $Pb^{2+}$ (about 308 keV) (see FIG. 3). The filters had the characteristic brown color of CuS except that the precipitate obtained from the solution with about 10000 μg of added $Pb^{2+}$ was dark black. The solubility of PbS is slightly higher than $Fe_2S_3$ (see FIG. 8), which may lead to less interference of $Pb^{2+}$ on the micro-precipitation than $Fe^{3+}$.

For solutions with added $Ni^{2+}$, the Po yield and the FWHM were not affected in the quantity range studied (see FIGS. 2 and 3). All the filters had the brown color of CuS precipitate. This may be expected since NiS is expected to be completely soluble in 1 M HCl.

For the solutions with less than about 100 μg of transition metal impurities, no additional purification step may be needed. Similar to the conventional spontaneous plating technique, the interfering transition metals for the CuS micro-precipitation technique may be removed using suitable additional sample pre-treatment steps such as extraction chromatography[13,28]. The addition of such a purification step may be dependent on the sample matrix used.

Determination of $^{210}Po$ in Spike Samples

To evaluate the performance of the disclosed micro-precipitation method, replicate samples spiked with known amounts of $^{210}Po$ were analyzed using $^{209}Po$ as the tracer for yield correction.

A set of samples spiked with known amounts of $^{210}Po$ were prepared by adding 5-100 mBq of $^{210}Pb$ standard (in secular equilibrium with its daughter $^{210}Po$) to about 10 mL of about 1 M HCl. Then 50 mBq of $^{209}Po$ tracer was added to the spike and blank samples for yield monitoring and correction. All the samples were then processed through the micro-precipitation procedure described above (using about 50 μg of $Cu^{2+}$ in about 10 mL of about 1 M HCl, over a reaction time of about 10 min), and the counting sources were prepared for the determination of $^{210}Po$ by alpha spectrometry.

Figure 7:
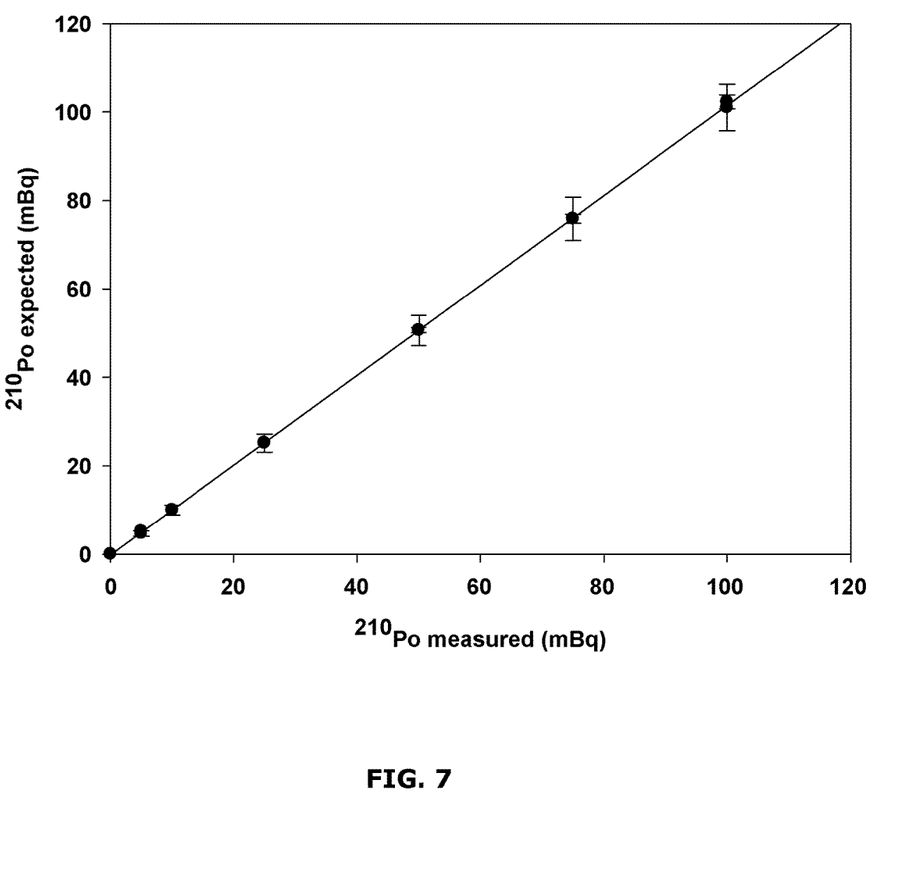
FIG. 7 is a chart showing correlation between expected and measured polonium counts.

Example results are shown in FIG. 7. As shown, the measured activities of $^{210}Po$ in the spiked samples ranging from about 5 to about 100 mBq agreed with the expected values. Good linearity (slope=1.0141) and correlation ($R^2$=0.9999) were observed, demonstrating acceptable accuracy and precision of the disclosed method for the determination of $^{210}Po$ in environmental and biological samples.

The present disclosure may provide a relatively fast method for the preparation of alpha counting sources of polonium using sulfide micro-precipitation. In particular, CuS co-precipitation was investigated. The disclosed method may be relatively robust, rapid and simple, and may be easier and faster than conventional spontaneous plating methods for the measurement of $^{210}Po$ by alpha spectrometry.

Since the disclosed method may not require the use of a relatively expensive silver disc, the disclosed method may help to reduce the cost of Po analysis.

The disclosed micro-precipitation technique may help to increase the sample analysis throughput and/or reduce the analysis cost. Thus, the disclosed method may be useful for $^{210}Po$ radioassays in emergency samples, among other applications.

In some examples (e.g., using about 0.1 to about 1 M HCl), the disclosed method may be compatible with typical conventional sample preparation procedures for $^{210}Po$ using ion exchange or extraction chromatography purification techniques.

Potential interferences of alpha emitting radionuclides and transition metals on the micro-precipitation yield and alpha energy resolution were also examined in example studies. Example results suggest that the disclosed method may be suitable to be adapted for the determination of Po in a variety of sample matrices by alpha spectrometry. The disclosed method may be applicable to routine and/or emergency radioanalytical procedures for the measurement of Po in environmental and/or biological samples.

The embodiments of the present disclosure described above are intended to be examples only. Alterations, modifications and variations to the disclosure may be made without departing from the intended scope of the present disclosure. While the systems, devices and processes disclosed and shown herein may comprise a specific number of elements/components, the systems, devices and assemblies could be modified to include additional or fewer of such elements/components. For example, while any of the elements/components disclosed may be referenced as being singular, the embodiments disclosed herein could be modified to include a plurality of such elements/components. Selected features from one or more of the above-described embodiments may be combined to create alternative embodiments not explicitly described. All values and subranges within disclosed ranges are also disclosed. The subject matter described herein intends to cover and embrace all suitable changes in technology. All references mentioned are hereby incorporated by reference in their entirety.

REFERENCES

1. Cornett, J.; Tracy, B.; Kramer, G.; Whyte, J.; Moodie, G.; Auclair, J. P.; Thomson, D. *Radiat. Prot. Dosim.* 2009, 134, 164-166.
2. Harrison, J.; Leggett, R.; Lloyd, D.; Phipps, A.; Scott, B. J. *Radiol. Prot.* 2007, 27, 17-40.
3. Aoun, M.; El Samrani, A. G.; Lartiges, B. S.; Kazpard, V.; Saad, Z. *J. Environ. Sci.* 2010, 22, 1387-1397.
4. Gans, I. *Sci. Total Environ.* 1985, 45, 93-99.
5. Carvalho, F. P. *Radiat. Prot. Dosim.* 1988, 24, 113-117.
6. Savidou, A. K. K.; Eleftheriadis, K. J. *Environ. Radioact.* 2006, 85, 94-102.
7. Tso, T. C.; Fisenne, I. *Radiat. Bot.* 1968, 8, 457-462.
8. Khater, A. E. M. J. *Environ. Radioact.* 2004, 71, 33-41.
9. Meli, M. A.; Desideri, D.; Roselli, C.; Feduzi, L. *J. Environ. Radioact.* 2009, 100, 84-88.
10. Hill, C. R. *Nature* 1960, 187, 211-212.
11. Takizawa, Y.; Zhao, L.; Yamamoto, M.; Abe, T.; Ueno, K. *J. Radioanal. Nucl. Chem.* 1990, 138, 145-152.

12. Shabana, E. I.; Elaziz, M. A.; Al-Arifi, M. N.; Al-Dhawailie, A. A.; Al-Bokari, M. A. *Appl. Radiat. Isot.* 2000, 52, 23-26.
13. Matthews, K. M.; Kim, C. K.; Martin, P. *Appl. Radiat. Isot.* 2007, 65, 267-279.
14. Kelecom, A.; Gouvea, R. C. S. *J. Environ. Radioact.* 2011, 102, 443-447.
15. Karali, T.; Ölmez, S.; G. Yener. *Appl. Radiat. Isot.* 1996, 47, 409-411.
16. Eichrom Thecnologies, LLC., Analytical procedures, Lead-210 and Polonium-210 in Water, 2009.
17. Benedik, L.; Vasile, M.; Spasova, Y.; Wätjen, U. *Appl. Radiati. Isot.* 2009, 69, 770-775.
18. Bagnall, W.; Robertson, D. S. *J. Chem. Soc.* 1957, 1044-1046.
19. Figgins, P. E. *The radiochemistry of polonium*; N.A.S.-N.R.C., 1961.
20. Sillen, L. G.; Martell, A. E. *Stability Constants of Metal Ligand Complexes*; The chemical Society: London, 1964.
21. Vajda, N.; Törvényi, A.; Kis-Benedek, G.; Kim, C. K.; Bene, B.; Macsik, Z. *Radiochim. Acta* 2009, 97, 395-401.
22. Dai, X.; Kramer-Tremblay, S. *Health Phys.* 2011, 101, 144-147.
23. Maxwell, S. L.; Culligan, B. K.; Noyes, G. W. *J. Radioanal. Nucl. Chem.* 2010, 286, 273-282.
24. Dai, X.; Kramer-Tremblay, S.; Li, C. *Radiat. Prot. Dosim.* 2012, 151, 30-35.
25. Maxwell, S. L.; Culligan, B. K. (2012). *J. Radioanal. Nucl. Chem.* 2012, 293, 149-156.
26. Dai, X. *J. Radioanal. Nucl. Chem.* 2011, 289, 595-600.
27. Schweitzer, G. K.; Pesterfield, L. L. *The Aqueous Chemistry of the Elements*; Oxford University Press: New York, 2010.
28. Vajda, N.; LaRosa, J.; Zeisler, R.; Danesi, P.; Kis-Benedek, G. *J. Environ. Radioact.* 1997, 37, 355-372.

The invention claimed is:

1. A method for preparing alpha sources of polonium, comprising:
providing a sample of polonium in a solution;
introducing a controlled amount of sulfide and a controlled amount of copper for forming an insoluble sulfide salt in the solution, in order to co-precipitate polonium from the solution; and
filtering out the precipitates that contain the alpha sources of polonium.

2. The method of claim 1, wherein the controlled amount of copper is in the range of about 1 µg to about 100 µg.

3. The method of claim 2, wherein the controlled amount of copper is in the range of about 30 µg to about 70 µg.

4. The method of claim 3, wherein the controlled amount of copper is about 50 µg.

5. The method of claim 1, wherein there is a time period of at least about 10 min after introducing the sulfide and the copper, before filtering out the precipitates.

6. The method of claim 5, wherein the time period is no more than about 3 hours.

7. The method of claim 1, wherein the polonium is provided in an acidic solution.

8. The method of claim 7, wherein the solution comprises hydrochloric acid.

9. The method of claim 8, wherein the hydrochloric acid is in the solution at a concentration in the range of about 0.01 M to about 2 M.

10. The method of claim 9, wherein the hydrochloric acid has a concentration in the range of about 0.1 M to about 1 M.

11. The method of claim 10, wherein the hydrochloric acid has a concentration of about 1 M.

12. The method of claim 1, wherein the polonium is provided in a controlled amount of solution that is in the range of about 5 mL to about 20 mL.

13. The method of claim 12, wherein the controlled amount of solution is about 10 mL.

14. The method of claim 1, wherein filtering out the precipitates comprises filtering the sample of polonium using a vacuum box.

15. The method of claim 14, further comprising preparing multiple alpha sources from multiple samples of polonium in parallel, using the vacuum box.

16. The method of claim 1, further comprising drying the precipitates after the filtering and mounting the precipitates on a disc for counting by alpha spectrometry.

* * * * *